(12) United States Patent
Schachtel et al.

(10) Patent No.: US 9,165,273 B2
(45) Date of Patent: Oct. 20, 2015

(54) EXTERNALIZING ENTERPRISE WORKSPACES USING CONTENT PLUG-IN

(75) Inventors: Ohad Schachtel, Tel Aviv (IL); Orly Bleier, Hod Hasharon (IL); Regina Kreimer, Rishon Le Zion (IL); Avihai Tamari, Netanya (IL); Guy Moskovich, Zikhron Ya akov (IL)

(73) Assignee: SAP AG, Walldord (DE)

( * ) Notice: Subject to any disclaimer, the term of this patent is extended or adjusted under 35 U.S.C. 154(b) by 265 days.

(21) Appl. No.: 13/597,632

(22) Filed: Aug. 29, 2012

(65) Prior Publication Data

US 2014/0067995 A1 Mar. 6, 2014

(51) Int. Cl.
*G06F 15/16* (2006.01)
*G06Q 10/06* (2012.01)

(52) U.S. Cl.
CPC .................... *G06Q 10/0631* (2013.01)

(58) Field of Classification Search
USPC .......................... 709/204, 205, 206, 217, 219
See application file for complete search history.

(56) References Cited

U.S. PATENT DOCUMENTS

| | | | |
|---|---|---|---|
| 7,269,625 B1 * | 9/2007 | Willhide et al. | 709/206 |
| 7,676,542 B2 * | 3/2010 | Moser et al. | 709/204 |
| 8,161,120 B2 * | 4/2012 | Tan | 709/206 |
| 8,276,095 B2 * | 9/2012 | Cutler et al. | 715/804 |
| 8,683,346 B2 * | 3/2014 | Lavi et al. | 715/742 |
| 8,769,268 B2 * | 7/2014 | Morozov et al. | 713/164 |
| 2007/0124373 A1 * | 5/2007 | Chatterjee et al. | 709/204 |
| 2007/0271330 A1 * | 11/2007 | Mattox et al. | 709/203 |
| 2009/0254912 A1 * | 10/2009 | Roundtree et al. | 718/102 |
| 2011/0231592 A1 | 9/2011 | Bleier et al. | |
| 2012/0054639 A1 * | 3/2012 | Shi et al. | 715/751 |

* cited by examiner

*Primary Examiner* — Viet Vu
(74) *Attorney, Agent, or Firm* — Fish & Richardson P.C.

(57) ABSTRACT

The present disclosure describes methods, systems, and computer program products for externalizing an enterprise workspace to business applications. One computer-implemented method includes indicating data within an application to be included in a new module, initiating a command to create the new module using the indicated data, transmitting the command to create the new module to an external server, receiving from the external server a list of available enterprise workspaces for adding the new module, selecting at least one available enterprise workspace from the list of available enterprise workspaces, transmitting the selected enterprise workspace to the external server, and receiving a confirmation of the new module creation.

20 Claims, 5 Drawing Sheets

EXTERNALIZING ENTERPRISE WORKSPACES USING CONTENT PLUG-IN

BACKGROUND

An enterprise portal, also known as an enterprise information portal (EIP) or corporate portal, is a framework for integrating information, people and processes across organizational boundaries. The enterprise portal can provide a secure unified access point, often in the form of a web-based user interface (e.g., a web portal realized using an internet browser on a computing device), and can be designed to aggregate and personalize information through application-specific portlets. One significant feature of enterprise portals is de-centralized content contribution and content management, which can keep enterprise portal information organized and updated. Fundamental features of an enterprise portal may include: a single sign-on/log-in, application integration, content federation, environment customization, information personalization, access control, and/or enterprise search/support, among others.

The enterprise portal can include an enterprise workspace plug-in to provide a flexible, intuitive environment. The enterprise workspace plug-in enables business users to integrate, organize, and use various content, such as applications, reports, dashboards, web content and documents from various sources. The enterprise workspace can also provide different types of user environments, for example, a personal workspace, a shared workspace, or others. Users can organize content for their own purposes in a personal workspace, or share the content with a team or group of colleagues in a shared workspace. The workspace can enable quick and easy re-combination of existing corporate assets with emphasis on structured content, such as reports and applications, among others. Users may also collaborate using an enterprise workspace for easy integration of services.

SUMMARY

The present disclosure relates to computer-implemented methods, systems, and computer-readable media for externalizing an enterprise workspace using plug-ins. One computer-implemented method includes indicating data within an application to be included in a new module, initiating a command to create the new module using the indicated data, transmitting the command to create the new module to an external server, receiving from the external server a list of available enterprise workspaces for adding the new module, selecting at least one available enterprise workspace from the list of available enterprise workspaces, transmitting the selected enterprise workspace to the external server, and receiving a confirmation of the new module creation.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by the data processing apparatus, cause the apparatus to perform the actions.

The foregoing and other implementations can each optionally include one or more of the following features:

A first aspect, combinable with the general implementation, wherein the command is initiated by a plug-in associated with the application.

In a second aspect, combinable with any of the previous aspects, wherein the transmitted command is received by an operating system extension and forwarded to the external server.

In a third aspect, combinable with any of the previous aspects, wherein the forwarded command is received by a module generator on the external server.

In a fourth aspect, combinable with any of the previous aspects, wherein the list of available enterprise workspaces is generated by the module generator.

A fifth aspect, combinable with any of the previous aspects, further comprising confirming the selected available enterprise workspace.

A sixth aspect, combinable with any of the previous aspects, further comprising creating the new module on the external server in the selected available enterprise workspace.

The subject matter described in this specification can be implemented in particular implementations so as to realize one or more of the following advantages. An enterprise workspace is normally created in a dedicated environment where the structure, modules, members, and other parameters can be defined for the enterprise workspace. A user is usually required to enter the dedicated environment to create or modify the workspace. The dedicated environment may require the user to temporarily exit a current working environment which contains content the user wants to add to the workspace. Externalizing the workspace to the current working environment, for example, an operating system, local applications, a web browser, or others, saves the user from the need to change environments and therefore improves productivity and efficiency. For example, the workspace can offer a plug-in to a current working environment which creates new modules in a particular workspace without disconnecting from the current working environment. In addition, externalizing the workspace can enhance and improve the collaboration and the ability of multi-device access for data concepts in the enterprise workspaces.

While generally described as computer-implemented software embodied on tangible and non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This specification describes computer-implemented methods, systems, and computer-readable media for externalizing an enterprise workspace using plug-ins. At a high level, an enterprise workspace can integrate, organize, and provide various content to users, through an associated enterprise workspace page, such as applications, reports, dashboards, web content, and documents from various sources. The various content is integrated into the enterprise workspace in the form of modules, which can be inserted, arranged, and defined in the enterprise workspace environment. For example, the modules can be displayed on the enterprise workspace page in a specific orientation or visible only for users with a specific role or permission level. Modules may include a URL, an application, a link to a website, among others. On the enterprise workspace page, the target of the URL, the application, and the link can be displayed using associated modules. Besides creating and managing the modules in a dedicated enterprise workspace environment, the enterprise workspace can insert plug-ins into data sources permitting direct addition of modules with associated content from the data sources into the enterprise workspace.

Plug-ins can be installed in an operating system, for example by modifying the operating system registry, and into system and/or business applications. Users can interact with the plug-ins to add content associated with an associated plug-in to a desired enterprise workspace. The plug-in allows users to remain within a current working environment as opposed to leaving the current working environment to enter an enterprise workspace environment to add content. For example, a user may indicate data within an application to include in a new module to be added to an enterprise workspace. A command is initiated by the user to create the new module using the indicated data. In some implementations, the user-initiated command can be transmitted to an external server to create the new module. In some implementations, a list of available enterprise workspaces can be received from the external server in which to add the new module. After selecting at least one enterprise workspace from the received list of available enterprise workspaces, creation of the new module on the selected enterprise workspace can be confirmed.

Figure 1:
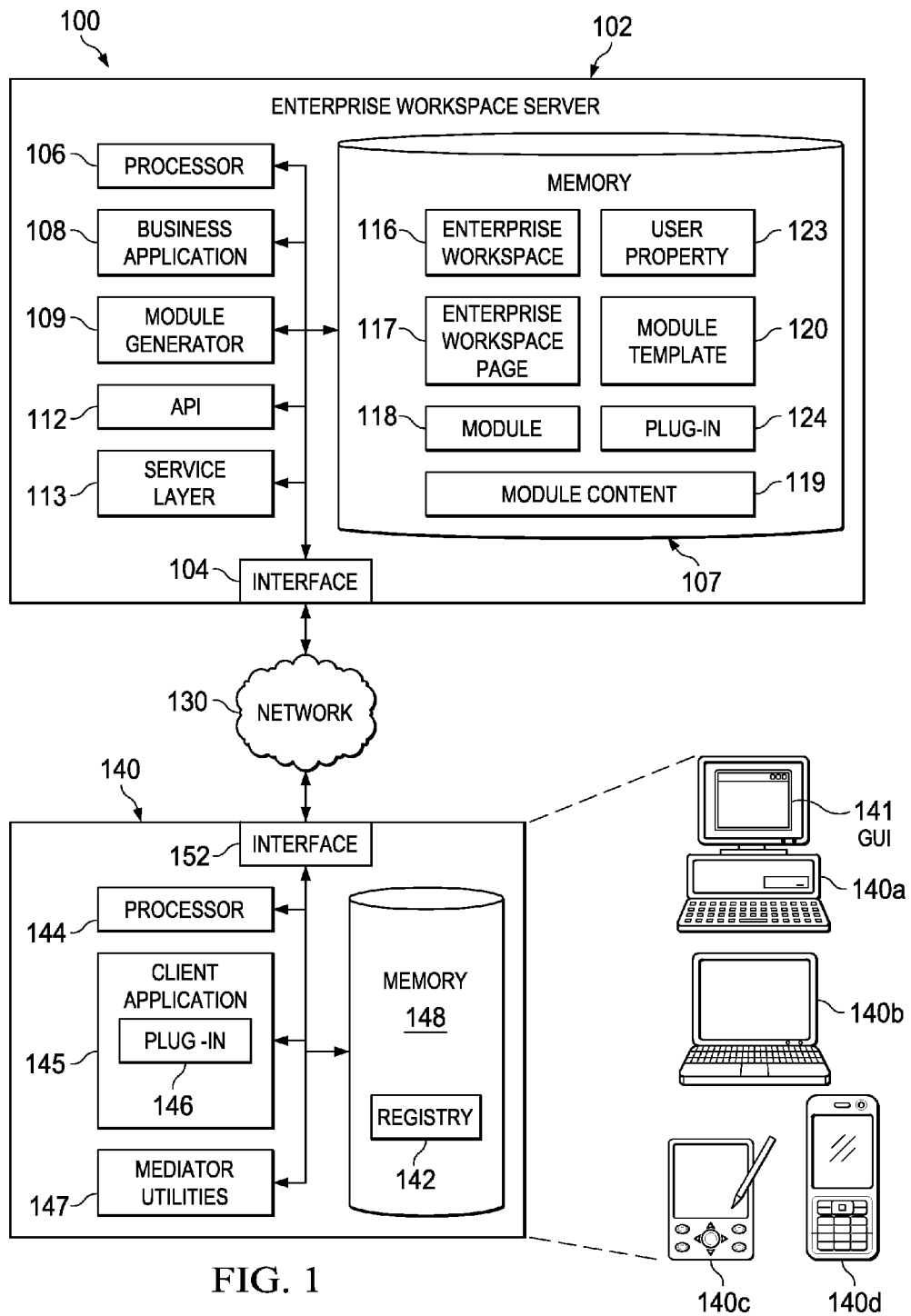
FIG. 1 illustrates an example environment for implementing various features of an enterprise workspace server providing plug-in enabled workspace externalization.

FIG. 1 illustrates an example environment for implementing various features for externalizing an enterprise workspace using plug-ins. The illustrated example environment 100 includes, or is communicably coupled with, a client 140, and an enterprise workspace server 102. At least some of the communications between the enterprise workspace server 102 and the client 140 may be performed across or using network 130. In general, environment 100 depicts an example configuration of a system for providing the client 140 with an enterprise workspace at the enterprise workspace server 102. For example, the enterprise workspace server 102 can provide enterprise workspaces, business applications, processing resources, and/or databases to the client 140. In alternative implementations, the elements illustrated in FIG. 1 can be included in or associated with different and/or additional servers, clients, networks, and locations other than those as shown. For example, there may be additional clients sending messages to the enterprise workspace server 102. As another example, multiple clients may be connected to one or more servers to obtain various functionalities and services. In some implementations, one or more of the components illustrated within the enterprise workspace server 102, the client 140, or any of the other illustrated components, can be located in multiple or different servers, cloud-based networks, or other locations accessible to the enterprise workspace server 102 (e.g., either directly or indirectly using network 130).

At a high level, the enterprise workspace server 102 can be connected with one or more clients such as the client 140. For example, the enterprise workspace server 102 can host a list of enterprise workspaces that can be accessed and viewed at the client 140. The enterprise workspace server 102 can send a requested enterprise workspace page to the client 140 and enable the client 140 to install an enterprise workspace plug-in 124. The enterprise workspace plug-in 124 can be associated with the operating system of the client, a client application 145 or other applications of the client 140 (e.g., system, or web applications). The installation of the enterprise workspace plug-in 124 can be similar to software installations using common installation or setup programs that modifies a registry, for example system registry 142, and then launches the installed enterprise workspace plug-in 146 as the applications are launched. The installed enterprise workspace plug-in 146 can be integrated into the menus of the applications, an icon, or other selectable user interface components. The user can use the installed enterprise workspace plug-in 146 to add content from the associated operating system and/or applications to the enterprise workspace.

In the illustrated implementation of FIG. 1, the enterprise workspace server 102 includes an interface 104, a processor 106, memory 107, a business application 108, a module generator 109, an application programming interface (API) 112, and a service layer 113. The interface 104 is used by the enterprise workspace server 102 to communicate with other systems in a client-server or other distributed environment (including within environment 100) connected to the network 130 (e.g., the client 140, as well as other systems communicably coupled to the network 130). The interface 104 generally includes logic encoded in software and/or hardware in a suitable combination and operable to communicate with the network 130. More specifically, the interface 104 may include software supporting one or more communication protocols associated with communications such that the network 130 or the interface hardware is operable to communicate physical signals within and outside of the illustrated environment 100.

The processor 106 can be any appropriate processing unit or units to enable computation in the enterprise workspace server 102. Although illustrated as a single processor 106 in the enterprise workspace server 102, two or more processors may be used in the enterprise workspace server 102 according to particular needs, desires, or particular embodiments of environment 100. Generally, the processor 106 executes instructions and manipulates data to perform the operations of the enterprise workspace server 102 and, specifically, the functionality associated with the corresponding business application 108 and/or module generator 109. In one implementation, the server's processor 106 executes the functionality required to receive inbound communications from and send outbound communications to the client 140, as well as the functionality required to perform the operations of the associated business application 108 and/or module generator 109, among others.

The memory 107 of the illustrated enterprise workspace server 102 stores at least a list of enterprise workspaces 116, the associated enterprise workspace pages 117, a number of modules 118, the associated module content 119, the associated module template 120, user properties 123, the plug-in 124, and other data and program instructions. Some or all of the elements illustrated within memory 107 may be stored external to the memory 107. In some implementations, including a cloud-based system, some or all of the memory 107 may be stored remote from the enterprise workspace server 102, and communicably coupled to the enterprise workspace server 102 for usage. Specifically, the memory 107 can store the enterprise workspaces 116 created by the client 140 and the enterprise workspace page 117 generated at the enterprise workspace server 102. The enterprise workspaces 116 are created using modules 118 that can be predefined at the enterprise workspace server 102 or locally and/or remotely created and/or added to the enterprise workspace server 102. The modules 118 can include the module content 119 and the module template 120 that may be stored and/or retrieved locally and/or remotely. The memory 107 also stores user properties 123, for example, a user's role, preferences, and/or other data associated with an enterprise portal, enterprise workspace, and/or the client application 145.

At a high level, the business application 108 can be any software for performing business and/or non-business functions on a particular enterprise workspace server 102. For example, the business application 108 can communicate with client applications 145 for performing specific functionalities, such as generating an enterprise workspace page 117, adding modules 118 associated with business application 108 content to a particular enterprise workspace page 117, etc. The business application 108 may poll data from multiple client applications 145 and systems, and generate an enterprise workspace page 117 based on the data. In some implementations, the business application 108 may operate in response to and in connection with one or more requests received from an associated client 140 or other remote client 140. Additionally, the business application 108 may operate in response to and/or in connection with one or more requests received from other applications (not illustrated) external to the enterprise workspace server 102. For example, the operation of the business application 108 to externalize the enterprise workspace 116 by permitting the addition of modules 118 from external client applications 145 to an enterprise workspace page 117 may be initiated by a request to install a particular enterprise workspace plug-in 146 and to transfer desired content to be added to the enterprise workspace page 117 to the enterprise workspace server 102. In some implementations, the business application 108 may communicate with one or more of the client applications 145 that represent a web-based application accessed and executed by remote clients 140 using the network 130 (e.g., through the Internet, or using one or more cloud-based services associated with the business application 108).

The module generator 109 generates new modules 118 for the enterprise workspace 116/enterprise workspace page 117 based on content selected at the client 140. For example, the enterprise workspace plug-in 146 is installed on the client application 145. The installation allows the plug-in 146 to register with the operating system registry 142 and to be embedded natively in the client application 145. At the launch of the client application 145, the enterprise workspace plug-in 146 is loaded with the client application 145 and can then be used by a user to indicate data within the client application 145 to be included in a new module 118 on an enterprise workspace page 117. In some embodiments, the plug-in 146 can be integrated within the menus of the client application 140. In other instances, the plug-in 146 can be presented as a quick-launch button or other suitable user interface component.

In some implementations, a user, for example, can select within the menu or using the quick-launch button to add content, data, destination, and/or other sources to be included in a new module 118. In this specification, the term "data" is used to encompass the mentioned content, data, destination, and other sources. The selection can include operations such as hold-and-drag, right-click for a pop-up menu, and/or clicking on a menu option to open a selection dialog or to save default content to destination. In some implementations, selecting a menu item or clicking the launch button triggers a request for the enterprise workspaces component—'Workspace Explorer'. The request can be sent with the current browser URL as a parameter and by selecting the desired workspace (from a list presented by the workspace explorer component). A module 118 is being created/updated using Enterprise Workspaces API 112 with the data (i.e., current browser URL) sent as a parameter in the request for enterprise workspace server.

The selection can initiate a command at the client 140 to create the new module 118 with the module generator 109 using the indicated data. The command is transmitted to the enterprise workspace server 102. The module generator 109 then receives the command and the indicated data of the client application 140. Based on the received data, the module generator 109 can generate the new module 118 formatted for one of the enterprise workspaces 116/enterprise workspace pages 117. For example, the new module 118 may be a "Link list" module, a URL module, a text pad module, or other appropriate module, adding to a particular enterprise workspace page 117.

In some implementations, the enterprise workspace server 102 sends a list of available enterprise workspaces 116/enterprise workspace pages 117 to the client 140. The user at the client 140 can select one or more enterprise workspaces 116 and an associated enterprise workspace page 117 from the list on which to include the new module 118. The selected enterprise workspace 116/enterprise workspace page 117 is transmitted back to the enterprise workspace server 102. The new module 118 created in the selected enterprise workspace 116/enterprise workspace page 117 and can then be confirmed by the enterprise workspace server 102 to the client 140 with a confirmation indicator. The confirmation indicator may include a pop-up dialog, an email, a sound, a temporarily displayed user interface component, and/or other suitable confirmation indicator. The API 112 can enable a user to access and use the module generator 109 to generate the new module 118 without necessarily launching an enterprise workspace 116 development environment from the client 140. The API 112 can include specifications for routines, data structures, object classes, and variables at the enterprise workspace server 102. The interaction of selection is further described at the mediator utilities 147 of the client 140.

The service layer 113 can provide middleware that serves the plug-in 146 and the client application 145 at a higher application layer. The service layer 113 can provide capability servers owned by a telecommunication network service provider, accessed through open and secure API 112 by application layer servers owned by content providers. The service layer 113 can also provide an interface to core networks at a lower resource layer, which may be a control layer or transport layer. In some implementations, the service layer 113 and the API 112 can manage the module content 119 determined from the data indicated in the client application 145 (e.g., the data can be indicated by the current loaded data, a selection of the current loaded data, or a link to the data). The module generator 109 can use the determined module content 119 and the module template 120 stored in the memory 107 to generate the module 118. The module 118 can then be associated with and displayed on the enterprise workspace page 117 of an associated enterprise workspace 116. The module template 120 may be selected from a module template database based on the user property 123. For example, a set of module templates 120 may be predefined for a particular user property 123, such as a user's role, preference, group or member information. These predefined set of module templates 120 can then be associated with particular data type selected at the plug-in 146.

The enterprise workspace server 102 is any server or system that stores, manages, and executes functionality associated with the business application 108 and/or module generator 109. In some instances, each enterprise workspace server 102 may store and/or execute a plurality of various other applications and components (not illustrated); while in other instances, the enterprise workspace server 102 may be a dedicated server meant to store and execute the business application 108 and/or module generator 109 for a particular platform or application and its related functionality. In some instances, the enterprise workspace server 102 may include a web server or be communicably coupled with a web server, where one or more of the business applications 108 and/or module generators 109 associated with the enterprise workspace server 102 represent web-based (or web-accessible) applications accessed and executed through requests and interactions received by the client 140.

The enterprise workspace server 102 can include an electronic computing device operable to receive, transmit, process, store, or manage data and information associated with the environment 100. The enterprise workspace server 102 illustrated in FIG. 1 can be responsible for receiving application-related requests from one or more clients 140 (as well as any other entity or system interacting with the enterprise workspace server 102, including desktop or mobile client systems), responding to the received requests by processing said requests in the associated business application 108 and/or module generator 109, and sending the appropriate responses from the appropriate component back to the requesting client 140 or other requesting system. Components of the enterprise workspace server 102 can also process and respond to local requests from a user locally accessing the enterprise workspace server 102. Accordingly, in addition to requests from the client 140 illustrated in FIG. 1, requests associated with a particular component may also be sent from internal users, external or third-party customers, and other associated business applications, business processes, as well as other appropriate entities, individuals, systems, or computers. In some instances, the business application 108 and/or the module generator 109 may be a web-based application executing functionality associated with a networked or cloud-based business process.

Referring now to the client 140 illustrated in FIG. 1, the client 140 may be any computing device operable to connect to or communicate with the enterprise workspace server 102 using a wireline or wireless connection directly or using the network 130, or another suitable communication means or channel. For example, the client 140 can be a desktop computer 140a, a notebook computer 140b, a tablet computer 140c, or a smartphone 140d. In some instances, the client 140 may be a part of or associated with a business process involving one or more of a remote developer or user associated with the enterprise workspace server 102. It will be understood that there may be any number of clients 140 associated with, or external to, environment 100. For example, while the illustrated environment 100 includes a single client 140, alternative implementations of environment 100 may include multiple clients communicably coupled to one or more of the systems illustrated. In some instances, one or more clients 140 may be associated with administrators of the environment, and may be capable of accessing and interacting with the settings and operations of one or more portal systems 103, and/or other components of the illustrated environment 100. Additionally, there may also be one or more additional clients 140 external to the illustrated portion of environment 100 capable of interacting with the environment 100 using the network 130.

The illustrated client 140 includes an interface 152, a processor 144, the client application 145, a mediator utility 147, and a memory 148. The interface 152 is used by the client 140 for communicating with other systems in a distributed environment—including within the example environment 100—connected to the network 130; for example, the enterprise workspace server 102 as well as other systems communicably coupled to the network 130 (not illustrated). The interface 152 may also be consistent with the above-described interface 104 of the enterprise workspace server 102 or other interfaces within the example environment 100. The processor 144 may be consistent with the above-described processor 106 of the enterprise workspace server 102 or other processors within the example environment 100. Specifically, the processor 144 executes instructions and manipulates data to perform the operations of the client 140, including the functionality required to send requests to the enterprise workspace server 102 and to receive and process responses from the enterprise workspace server 102. The memory 148 may be consistent with the above-described memory 107 of the enterprise workspace server 102 or other memories within the example environment 100 by storing objects and/or data associated with the purposes of the client 140.

Further, the representative client 140 illustrates a GUI 141 applicable to the client 140 in general. The GUI 141 provides a visual interface with at least a portion of the example environment 100. Generally, through the GUI 141, enterprise workspace server 102 users are provided with an efficient and user-friendly presentation of data provided by or communicated within the example environment 100. For example, the GUI 141 may be associated with the client application 145 and used to view, navigate, and/or configure content of the enterprise workspace server 102, navigation lists, and other associated content served by enterprise workspace server 102. In some implementations, the client application 145 may be used to access various portions of the enterprise workspace server 102. In some instances, the client application 145 may be an agent or client-side version of the enterprise workspace server 102 or other suitable component of the enterprise workspace server 102.

The mediator utility 147 can manage the plug-ins 146 that are associated with the client application 145. For example, the mediator utility 147 can provide utilities for the plug-ins 146 to define data or content to be selected in the new module. For example, the utilities can include hold-and-drag selection of text or graphic information, right-click menus for pop-up menu selection, or quick-launch icons and drop-down menus for selecting the currently displayed content. In some implementations, the mediator utility 147 can include data selection tools, and access to the module template 120. The selection tools can incorporate the plug-ins 146 into pop-up menus of the operating system. In some instances, the mediator utility 147 can enable the module generator 109 to generate new modules directly in the operating system without the use of a particular client application 145. The mediator utility 147 can also enable users to select from the list of available enterprise workspace sent from the enterprise workspace server 102.

As used in this disclosure, each client 140 is intended to encompass a personal computer, touch screen terminal, workstation, network computer, kiosk, wireless data port, smart phone, personal data assistant (PDA), one or more processors within these or other devices, or any other suitable processing device. For example, each client 140 may include a computer that includes an input device, such as a keypad, touch screen, mouse, or other device that can accept user information, and an output device that conveys information associated with the operation of one or more client applications 145, and/or the client 140 itself, including digital data, visual information, or the GUI 141. Both the input and output device may include fixed or removable storage media such as a magnetic storage media, CD-ROM, or other suitable media, to both receive input from and provide output to users of client 140 through the display, namely, the GUI 141. As will be appreciate to those skilled in the art, alternative implementations of one or more of these components may be used, as well as implementations where additional components may also be included.

FIG. 1 depicts a client-server environment, but could also represent a cloud-based computing network. Various other implementations of the illustrated environment 100 may be provided to allow for increased flexibility in the underlying system, including multiple enterprise workspace servers 102 performing or executing one or more additional or alternative instances of the business application 108 and/or module generator 109 for one or more different platforms, as well as multiple instances of the business application 108 and/or module generator and their related functionality. In those instances, the different enterprise workspace servers 102 may communicate with each other using a cloud-based computing network or through the connections provided by network 130. Generally, the enterprise workspace server 102 may be communicably coupled with the network 130 that facilitates wireless or wireline communications between the components of the environment 100 (i.e., between the enterprise workspace server 102 and one or more clients 140), as well as with any other local or remote computer, such as additional clients, servers, or other devices communicably coupled to the network 130, including those not illustrated in FIG. 1. In the illustrated environment, the network 130 is depicted as a single network, but may be included in more than one network without departing from the scope of this disclosure, so long as at least a portion of the network 130 may facilitate communications between senders and recipients. In some instances, one or more of the components associated with the enterprise workspace server 102 may be included within the network 130 as one or more cloud-based services or operations.

Figure 2A:
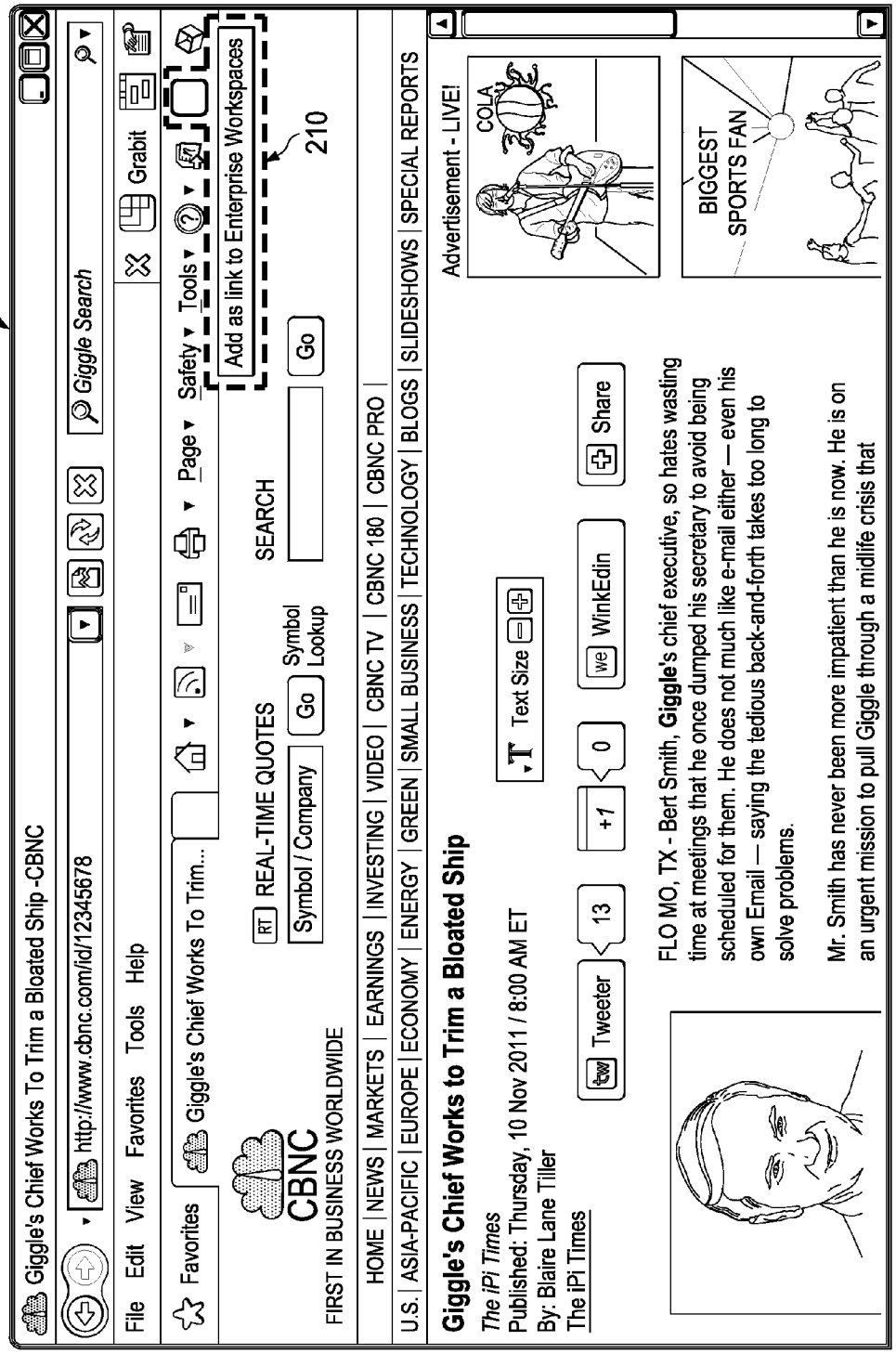
FIGS. 2A-2C illustrate example plug-in functionality access for enterprise workspace externalization.
Figure 2B:
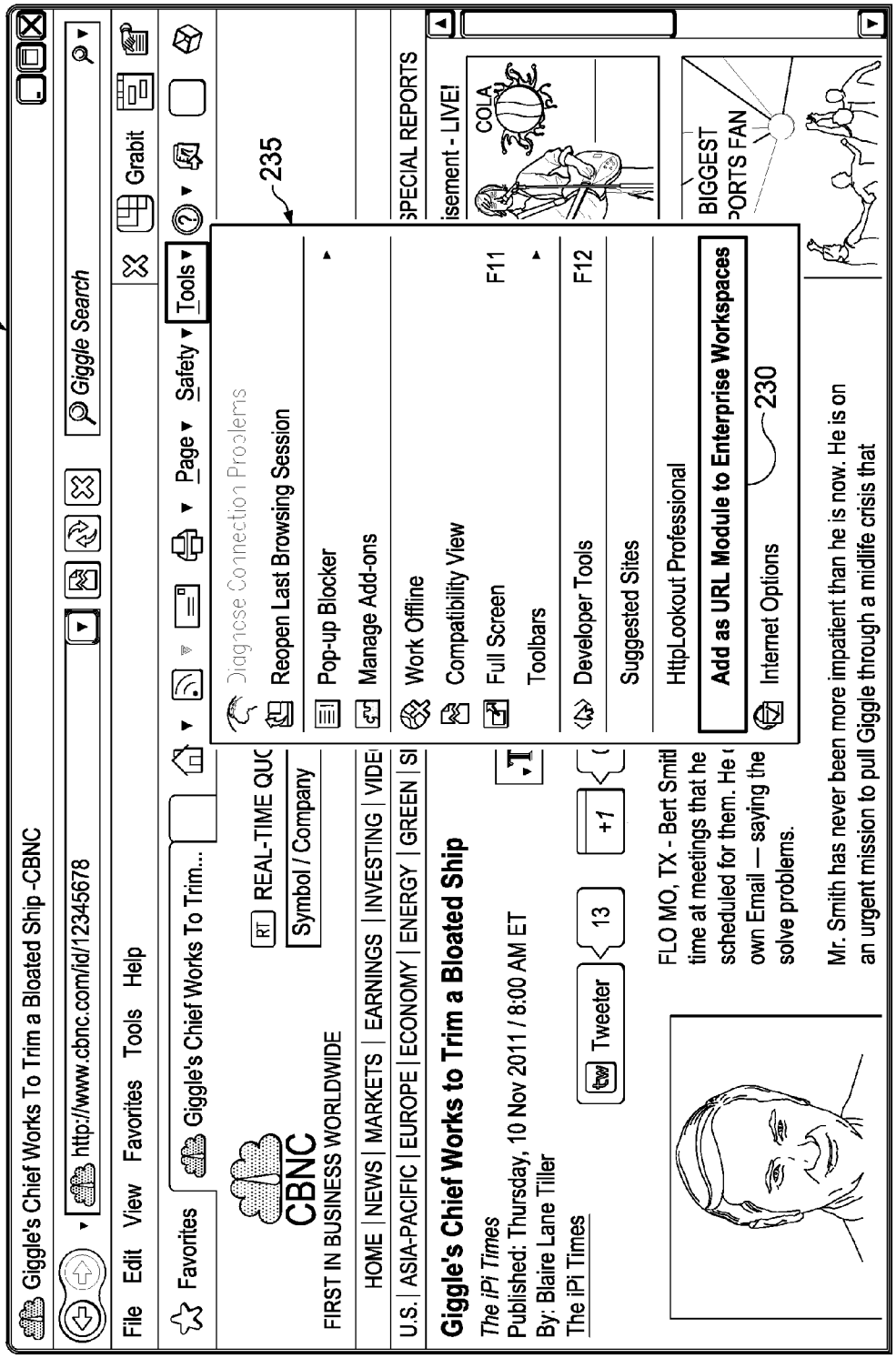
Figure 2C:
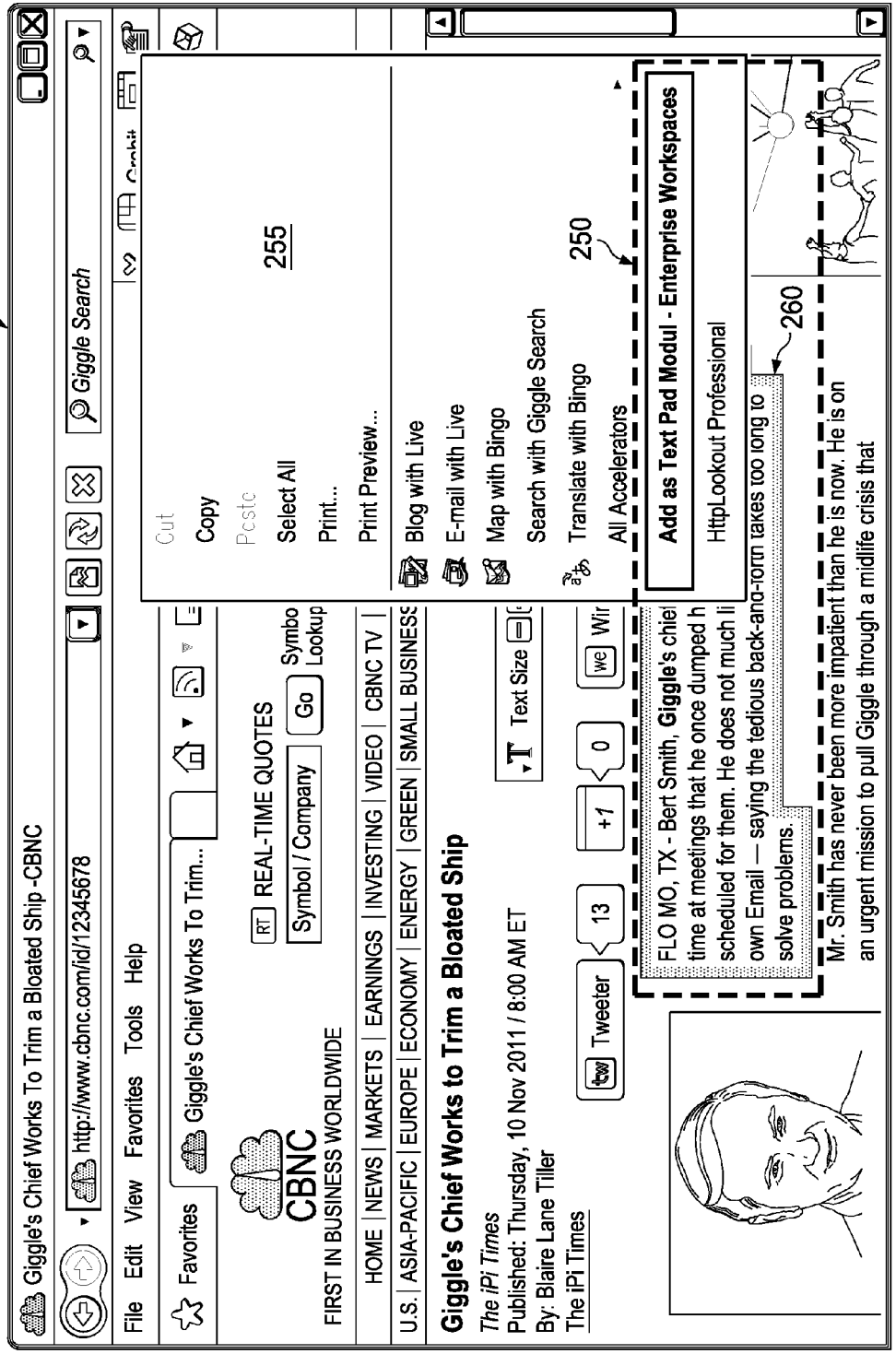

FIGS. 2A-2C illustrate example plug-in functionality access for enterprise workspace externalization. Referring to FIG. 2A, an example user interface 200 is shown with an example plug-in 210 access user interface component embedded in the user interface 200 as a menu icon. The example plug-in 210 access user interface component allows a user to add the current webpage link to a module as part of an enterprise workspace. For example, by clicking on the menu icon, the plug-in 210 can format the current webpage link into a command and transmit the command to the enterprise server 102 module generator 109 to create a new module containing the webpage link. The enterprise workspace server 102 can send a list of available enterprise workspaces to the user. The user can select one of the available enterprise workspaces and place the newly generated module to the enterprise workspace page. When the enterprise workspace page is loaded, the webpage can be displayed as content within the newly created module. In some implementations, the enterprise workspace server 102 can identify a list of available enterprise workspaces from the enterprise workspaces 116. The list can be sent to the client 140 in a table format allowing for selection. Upon receiving the selected list of enterprise workspaces, the enterprise workspace server 102 can associate the generated module 118 to the selected enterprise workspaces.

Turning now to FIG. 2B, similarly, an example user interface 220 is shown with an example plug-in 230. The example plug-in 230 can be embedded in the user interface 220 as a menu option in the dropdown menu 235 (in this example, the dropdown menu of "Tools"). A user may use a pointer device (e.g., a touch screen, a mouse, a laser tracker, etc.) to interact with the dropdown menu 235 and select the menu option of the plug-in 230. Upon selection, the plug-in 230 can add the current webpage as a URL module to one or more chosen enterprise workspaces. For example, when the user selects the menu option of the plug-in 230, a command is initiated to create an URL module in one of the enterprise workspaces. The command is sent to an enterprise workspace server such as the enterprise workspace server 102 illustrated in FIG. 1. A list of available enterprise workspaces is sent from the server to the user. The user can select one or more enterprise workspaces to incorporate the newly generated URL module. The selected workspaces are transmitted back to the server and a confirmation from the server is sent back to the user.

Turning now to FIG. 2C, an example user interface 240 is shown with an example plug-in 250 that can be embedded in the user interface 240 as a menu option in a pop-up system menu initiated by a gesture or a click. A user may user a pointer device to select a portion of text 260 or an area, then right click or hold down the selection gesture to bring up a pop-up system menu 255. The user can then select the menu option of the plug-in 250 on the pop-up system menu 255. Upon selection, the plug-in 250 can add the selected text as a text pad module to one or more chosen enterprise workspaces. For example, when the user selects the menu option on the pop-up menu 255, a command is initiated to create a text pad module in one of the enterprise workspaces. The text pad module can include the selected text in the enterprise workspace page to be displayed. The command is sent to an enterprise workspace server such as the enterprise workspace server 102 illustrated in FIG. 1. A list of available enterprise workspace is sent from the server to the user. The user can select one or more enterprise workspaces to incorporate the newly generated text pad module. The selected workspaces are transmitted back to the server and a confirmation from the server is sent back to the user. As will be apparent to those of skill in the art, other implementations are possible apart from the three provided examples illustrated in FIGS. 2A-2C.

Figure 3:
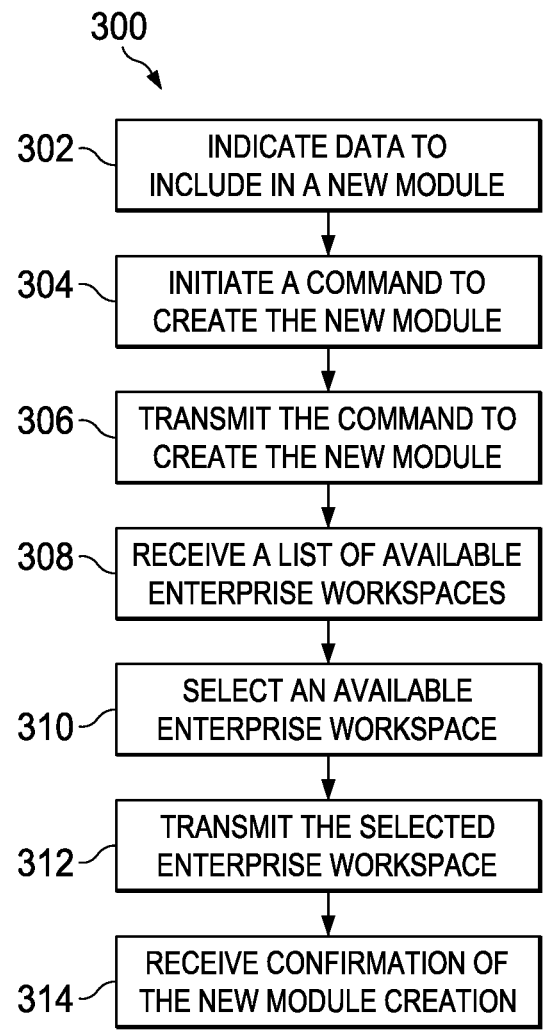
FIG. 3 illustrates an example method for plug-in enabled externalization of an enterprise workspace.

Turning now to FIG. 3, FIG. 3 is a flow chart 300 for plug-in enabled externalization of an enterprise workspace. For clarity of presentation, the description that follows generally describes method 300 in the context of FIGS. 1 and 2A-2C. However, it will be understood that method 300 may be performed, for example, by any other suitable system, environment, software, and hardware, or a combination of systems, environments, software, and hardware as appropriate.

At 302, a user can indicate data in the client applications to be included in a new module using an enterprise workspace externalization plug-in that has been installed and embedded onto a client application. The data can be a link to an internet source, a URL, a webpage, text data, image data, multimedia files, or other suitable type of data. From 302, method 300 proceeds to 304.

At 304, the user can select an icon, a menu option, or other control of the enterprise workspace plug-in. The selection initiates a command to create the new module containing the indicated data. In some implementations, the command can be associated with a dialog window for the user to specify details of the module creation, such as choosing a module type, a module template, or other specifications. From 304, method 300 proceeds to 306.

At 306, the command to generate a new module is transmitted to an enterprise workspace server. For example, the command can carry module creation specifications to the enterprise workspace server module generator to generate a new module based on the module creation specifications, the indicated data, and available module templates. From 306, method 300 proceeds to 308.

At 308, the user can receive a list of available enterprise workspaces/workspace pages from the enterprise workspace server. The list of available enterprise workspaces/workspace pages can be determined at the server based on compatibility with the newly generated module (e.g., type, size, etc.), the user's role, permission level, etc.

At 310, one or more available enterprise workspaces/enterprise workspace pages are selected by the user to include the newly generated module. For example, the user can select a personal and a shared enterprise workspace and one or more specific enterprise workspace pages to include the new module in. From 308, method 300 proceeds to 310.

At 312, the enterprise workspace/enterprise workspace page selection is transmitted back to the enterprise workspace server. The enterprise workspace/enterprise workspace page selection is confirmed at the enterprise workspace server, such that when the selected enterprise workspace page is loaded at other clients, the newly added module will be displayed along with existing content. From 312, method 300 proceeds to 314.

At 314, the user can receive a confirmation indication from the enterprise workspace server regarding the successful creation of the module in the selected enterprise workspaces/workspace page. Confirmation indications may include a pop-up dialog, an email, a sound, a temporarily displayed user interface component, and/or other suitable confirmation indicators. From 314, method 300 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX®), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
indicating data within an application to be included in a new module, wherein an enterprise workspace extension plug-in registers with the operating system of the application to permit native embedding of the enterprise workspace extension plug-in into the application, wherein the indication is performed using the enterprise workspace extension plug-in, and wherein the new module is integrated into an enterprise workspace;
initiating a command to create the new module using the indicated data;
transmitting the command to create the new module to an external server;
receiving from the external server a list of available enterprise workspaces that are compatible with the new module;
selecting at least one available enterprise workspace from the list of available enterprise workspaces;

transmitting the selected enterprise workspace to the external server; and receiving a confirmation of the new module creation.

2. The computer-implemented method of claim 1, wherein the command is initiated by the enterprise workspace extension plug-in associated with the application.

3. The computer-implemented method of claim 1, wherein the transmitted command is received by an operating system extension and forwarded to the external server.

4. The computer-implemented method of claim 3, wherein the forwarded command is received by a module generator on the external server.

5. The computer-implemented method of claim 1, wherein the list of available enterprise workspaces is generated by the module generator.

6. The computer-implemented method of claim 1, further comprising confirming the selected available enterprise workspace.

7. The computer-implemented method of claim 1, further comprising creating the new module on the external server in the selected available enterprise workspace.

8. A computer-program product comprising computer-readable instructions embodied on tangible non-transitory media and operable when executed to:

select data within an application to be included in a new module, wherein an enterprise workspace extension plug-in registers with the operating system of the application to permit native embedding of the enterprise workspace extension plug-in into the application, wherein the indication is performed using the enterprise workspace extension plug-in, and wherein the new module is integrated into an enterprise workspace;

initiate a command to create the new module using the selected data;

transmit the command to create the new module using an external server;

retrieve from the external server a list of available enterprise workspaces that are compatible with the new module;

identify, based on a user's input, at least one available enterprise workspace from the list of available enterprise workspaces; and transmit the selected enterprise workspace to the external server.

9. The computer-program product of claim 8, wherein the command is initiated by the enterprise workspace extension plug-in associated with the application.

10. The computer-program product of claim 8, wherein the transmitted command is received by an operating system extension and forwarded to the external server.

11. The computer-program product of claim 10, wherein the forwarded command is received by a module generator on the external server.

12. The computer-program product of claim 8, wherein the list of available enterprise workspaces is generated by the module generator.

13. The computer-program product of claim 8, further comprising instructions operable when executed to:

receive a confirmation of the new module creation;

confirm the selected available enterprise workspace; and creating the new module on the external server in the selected available enterprise workspace.

14. A system of one or more computers configured to perform operations comprising:

indicating data within an application to be included in a new module, wherein an enterprise workspace extension plug-in registers with the operating system of the application to permit native embedding of the enterprise workspace extension plug-in into the application, wherein the indication is performed using the enterprise workspace extension plug-in, and wherein the new module is integrated into an enterprise workspace;

initiating a command to create the new module using the indicated data;

transmitting the command to create the new module to an external server;

receiving from the external server a list of available enterprise workspaces that are compatible with the new module;

selecting at least one available enterprise workspace from the list of available enterprise workspaces;

transmitting the selected enterprise workspace to the external server; and receiving a confirmation of the new module creation.

15. The system of claim 14, wherein the command is initiated by the enterprise workspace extension plug-in associated with the application.

16. The system of claim 14, wherein the transmitted command is received by an operating system extension and forwarded to the external server.

17. The system of claim 15, wherein the forwarded command is received by a module generator on the external server.

18. The system of claim 14, wherein the list of available enterprise workspaces is generated by the module generator.

19. The system of claim 14, further comprising confirming the selected available enterprise workspace.

20. The system of claim 14, further comprising creating the new module on the external server in the selected available enterprise workspace.

* * * * *